United States Patent [19]

Lewandowski

[11] 4,147,154
[45] Apr. 3, 1979

[54] SOLAR HEAT TRACKING AND COLLECTING APPARATUS

[76] Inventor: Robert E. Lewandowski, c/o Mayfield Stage, Boise, Id. 83707

[21] Appl. No.: 813,940

[22] Filed: Jul. 8, 1977

[51] Int. Cl.² ............................................... F24J 3/02
[52] U.S. Cl. ..................................... 126/270; 126/271
[58] Field of Search ............... 126/270, 271; 237/1 A; 60/641

[56] References Cited

U.S. PATENT DOCUMENTS

| | | | |
|---|---|---|---|
| 3,174,476 | 3/1965 | Steinberg | 126/270 |
| 3,988,166 | 10/1966 | Beam | 126/271 |
| 4,077,391 | 3/1978 | Way, Jr. | 126/271 |

Primary Examiner—Kenneth W. Sprague
Attorney, Agent, or Firm—Paul F. Horton

[57] ABSTRACT

Solar heat tracking and collecting apparatus including a frame, means for rotating the frame in altitude and azimuth, a solar heat concentrator mounted on the frame and a solar energy sensing means disposed on the frame and operable to control the frame rotation means. The solar heat concentrator includes a substantially rectangular, flat collector plate and two pair of oppositely disposed light reflective side walls bounding the collector plate, the side walls in a converging relationship to one another. The device may also contain a triphase solar mode sensor which is operable during the full sun phase to enable and disable the solar energy sensing means from automatically controlling the frame rotation. When the sky is overcast the solar energy sensing means become inoperable and the mode sensor then operates a timer which enables the obscured sun to be accurately tracked within very close tolerances. In a third phase, the darkness phase, the mode sensor is operable to reset the frame with its mounted solar heat concentrator to a substantially horizontal, easterly direction.

4 Claims, 6 Drawing Figures

SOLAR HEAT TRACKING AND COLLECTING APPARATUS

BACKGROUND OF THE INVENTION

1. Field of the Invention

This invention relates, in general, to solar tracking and collection apparatus, and in particular, to flat plate collectors including solar reflector means.

2. Description of the Prior Art

For many years there has been an increasing interest in the utilization of energy transmitted from the sun to dry grains, heat water, and to heat homes and office buildings. This interest is solar heating has been intensified in recent years because of shortages and higher costs of existing fuels. As a result, many types of solar furnaces have come into being, including hot water systems, hot air systems, and electrical systems. Such solar furnaces, however, have been typified by stationary collectors having extremely large collector plates which are inherently inefficient, and by tracking systems having expensive parabolic collectors and reflectors which are inefficient because of their incomplete tracking capabilities. Typical examples of prior art solar tracking and collecting systems include U.S. Pat. Nos. 3,991,151; 3,997,796; 3,993,041; 4,004,574; issued to St. Clair, Keyes, Diggs, and Barr, respectively.

SUMMARY OF THE INVENTION

The present invention comprises, generally, a solar heat tracking and collecting device including a frame, frame rotation means operable to rotate the frame in altitude and azimuth, a solar heat concentrator having a substantially flat rectangular collector plate and two pair of oppositely disposed light reflective side walls bounding the collector plate in a converging relationship, a solar energy sensing means operable to control the frame rotation means, and a triphase solar mode sensor operable to control the frame rotation automatically during full sun, operable to track the sun by means of a timer during overcast, and operable to automatically reset the frame to a substantially horizontal easterly direction during darkness.

It is therefore an object and feature of the present invention to provide a tracking system having a flat solar heat collector plate coupled with converging, flat, side reflector plates.

It is a further object and feature of the present invention to provide a tracking and collecting device having a triphase solar mode sensing system operable to engage and disengage automatic frame rotation during sunlight, operable to rotate the frame in close approximation to the sun's path during overcast conditions, and operable to automatically reset the device in a substantially horizontal and easterly direction during darkness.

A more particular object of the present invention is to provide a tracking and collecting device having a flat collector plate surrounded by substantially trapazoidal, planar, panels of polished aluminum set at converging angles one to the other.

Still other objects, features and attendant advantages will become apparent to those skilled in the art from a reading of the following detailed description of a physical embodiment of the invention taken in conjunction with the accompanying drawings forming a part of this specification.

DETAILED DESCRIPTION OF THE INVENTION

Figure 1:
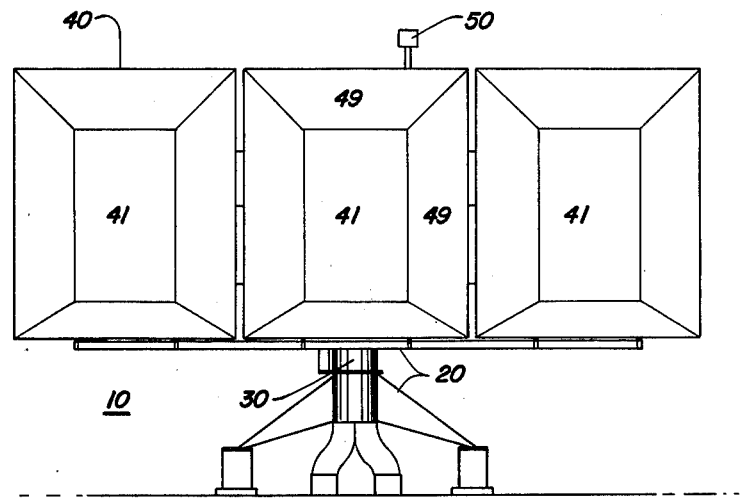
FIG. 1 is a perspective view illustrating a solar tracking and collecting device embodying the present invention.

Referring now to the drawings, and, more particularly, to FIG. 1, an embodiment to be prefered of a solar heat tracking and collecting device 10, made according to the present invention is disclosed. Solar heat tracking and collecting device 10 includes a frame 20, frame rotation means 30, solar heat concentrator 40, and solar energy sensing means 50.

Figure 2:
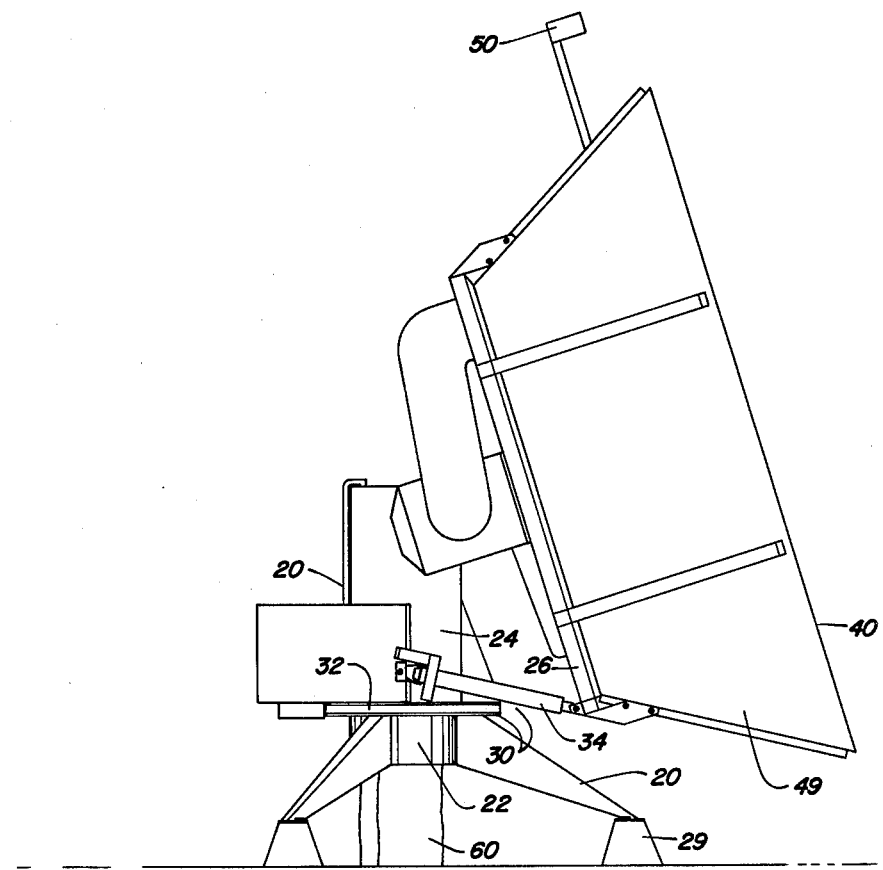
FIG. 2 is an elevated sectional view of the solar heat concentrator of the present invention.

As may best be seen in FIG. 2, frame 20 includes tripod 22, housing 24 and collector carriage 26. Tripod 22 is securely fastened to concrete piles 29 embedded in the earth. Tripod 22 serves as a platform for the frame rotation means and for housing 24, which encases fluid ducts 60, and as a pivot support for collector carriage 26.

Solar heat concentrator 40 is rotated horizontally by means of gear system 32 in a conventional manner and is tilted vertically by means of screw jack 34 connected between collector carriage 26 and housing 24. Gear systems 32 and screw jack 34 comprising a part of frame rotation means, generally designated by the numeral 30, are moved by separate motors, not shown, which are controlled by solar sensing means, as will hereinafter be explained.

Figure 3:
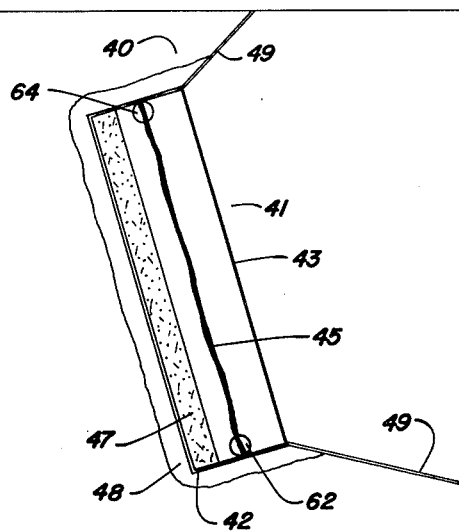
FIG. 3 is a perspective view of the solar sensor and triphase solar mode sensor of the present invention.

Rotatable solar heat concentrator 40 includes four converging, substantially trapezoidal, reflector side walls 49 which reflect and concentrate the solar energy onto heat collector 41. Side walls 49 may be formed of any suitable solar reflective material, such as glass, plastic, and metals. Polished aluminum, securely attached to a load bearing substraight is used in the preferred embodiment. Side walls 49 have a planar light reflecting surface set at an angle of approximately 118° to the collector in a converging relationship one to the other. Collector plate 41 seen to advantage in FIG. 3 includes a substantially box shaped housing 42, having an opening covered by a tempered glass plate 43. Inside housing 42 and located parallel with and spaced beneath glass plate 43 is a solar energy receiving plate 45 which absorbs solar energy coming through the glass plate and which releases the solar energy so collected to fluid coming into contact with the receiving plate. Receiving plate 45 is substantially planar, but may contain a multiplicity of corrugates to increase surface area. The receiving plate is metallic, aluminum or copper being preferred, and may be coated by any of a number of light absorbent paints and coating. Spaced beneath and parallel to the receiving plate is insulation 47 which prevents heat loss to the atmosphere. Solar heat concentrator 40 may be of any convenient size. In the preferred embodiment collector plate is 46 inches wide and 80 inches long at their bottom and most terminal edge, 128 inches at their uppermost edge and 48 inches wide. In using these demensions, the side walls are secured at an angle of 118° to the collector plate. It may also be advantageous to include a second insulative coating 48 on the exterior of housing 42 to further conserve the heat. Located preferably adjacent lowest terminal edge of solar heat collector 40 is a cold air intake port 62 serving as an inlet for the fluid communicating with aluminum collector plate 45, and an outlet port 64 leading to a heat storage unit, not shown.

Figure 4:
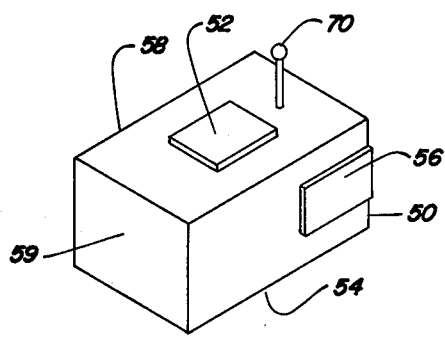
FIG. 4 is a plan view of the device shown in FIG. 3.
Figure 5:
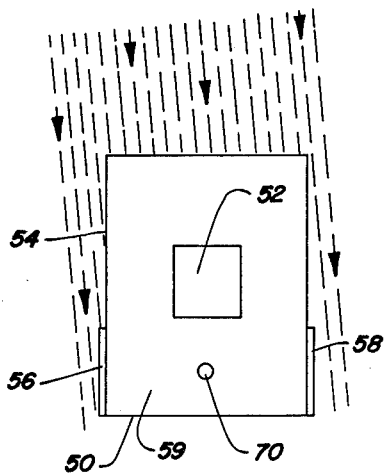
FIG. 5 is a top view of the device shown in FIG. 4.

A suitable solar energy sensing means is employed for controlling the motor which drives the frame rotation means. In the prefered embodiment, a solar energy sensing means comparator designated generally by the numeral 50 is employed. Solar energy sensing means 50 includes upper unit 52, lower unit 54, and side units 56 and 58 as seen in FIGS. 4 and 5. Solar energy sensing means 50 may be in the form of photocells or other photo or heat responsive elements, which are mounted on, or connected to solar heat collector 40 for movement therewith. Units 52, 54, 56, and 58 are enclosed box structures having a slit in the front thereof for admittance of light. These units are mounted on a larger box-shaped housing 59, as shown in FIG. 5.

Figure 6:
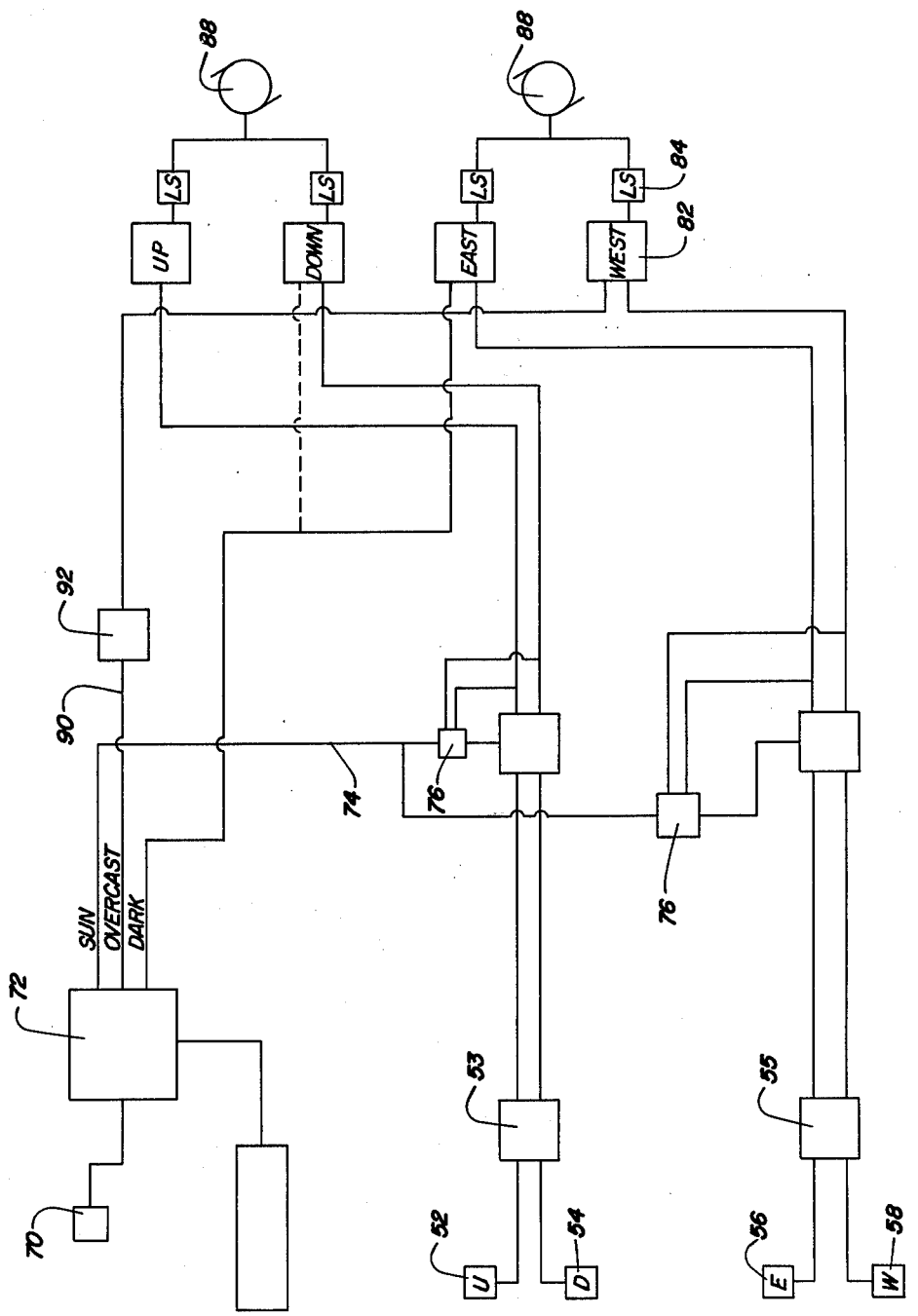
FIG. 6 is a circuit block diagram of the sensing devices and rotation means of the present invention.

The device may also contain a triphase solar mode sensor 70 which includes a photocell for detecting the amount of sunlight available. Mode sensor 70 is also located on housing 59 but at such a height that no shadow is cast upon it. Referring now to FIG. 6, a block diagram of the electrical circuitry involved may be seen. In operation, the mode sensor senses direct sunshine, overcast conditions, and darkness. During sunshine, mode sensor 70 senses the direct sunshine causing the mode amplifier 72 to activate autotrack enable line 74 with a clock pulse from oscillator 71 of one cycle every three minutes. The pulse causes an enable condition for one half of the cycle and a disable condition for the remaining half of the cycle. Each half cycle lasts one and one half minutes. During the beginning of the enable cycle the signals from the east-west sensing units 56 and 58 respectively, and the up-down units 52 and 54 respectively, are passed to comparator amplifiers 55 and 53 respectively, and are further allowed to pass and activate the motor drive relays 82, thus causing motors 88 to slowly turn the tracking device toward the brightest sunlight sensed by the sun sensors. The motors than track for a maximum of one and one half minutes or until the signals from the sensor comparator amplifiers 55 and 53 indicate that the correction is complete. At this point a one shot disable timer 76 interrupts the enable pulse, disabling any further correction for the remainder of the enable cycle, thus preventing random searching, oscillating, or excessive correction. The corrections continue every three minutes for the entire sunlit day. In the event the day is overcast or becomes overcast, mode sensor 70 will sense the overcast condition and the mode sensor amplifier 72 will cause the autotrack enable line 74 to remain disabled and an overcast clock track line 90 to be enabled with a clock pulse from oscillator 71 at one cycle every six minutes as long as the overcast condition exists. A one shot adjustable timer 92, which effectively shortens the enable half of the cycle causes the obscured sun to be accurately tracked at a few degrees every six minutes, within very close tolerances for the remainder of the day or until the sun becomes visible again. Once the sun again becomes visible the circuit goes into the sun mode and will directly track the sun until sunset or until the tracking device activates a limit switch designated generally by the numeral 84 indicating that the unit has advanced to the extent of its mechanical design.

After the end of a completed day of tracking, darkness, as sensed by mode sensor 70, will cause the mode sensor amplifier 72 to activate the east relay, thus rotating the unit towards the east until it activates the east limit switch shere it remains until the following morning. Optionally, as shown by the broken lines in FIG. 6, the mode sensor amplifier 72 may also activate the down relay thus rotating the unit to its full down position. It is to be noted that this system enables the tracking unit to accurately track the sun throughout the year at various latitudes at constantly changing altitudes and azimuth angles.

Having thus described in detail a preferred embodiment of the present invention, it is to be appreciated and will be apparent to those skilled in the art that many physical changes could be made in the apparatus without altering the inventive conceps and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Solar heat tracking and collecting apparatus comprising:
   a frame;
   frame rotation means engaging said frame and operable to rotate said frame in a horizontal and vertical direction;
   at least one solar heat concentrator mounted on said frame, said concentrator having a substantially rectangular flat collector plate and two pair of oppositely disposed light reflective side walls bounding said collector plate, the side walls in a converging relationship one to the other;
   a solar energy sensing means disposed on said frame and operable to control said frame rotation means; and
   a tri-phase solar mode sensor mounted on said frame, said mode sensor in one phase opeerable to enable and disable said solar energy sensing means from controlling said frame rotation means, in a second phase adapted to disable said solar energy sensing means and adapted to operate a timer for controlling said frame rotation means, and in a third phase operable to control said frame rotation means to reset the frame with mounted solar heat concentrator in a substantially easterly direction.

2. A device as described in claim 1, wherein the side walls are substantially trapezoidal and planar in configuration.

3. A device as described in claim 1, wherein said flat collector plate includes
   a rectangular housing having a back and four sides, the housing including a fluid inlet and outlet port;
   a layer of insulation contained within said housing and disposed against the back interior of the housing;
   a solar energy receiving plate spaced parallel from and on top of said insulation, said receiving plate in fluid communication with the inlet and outlet ports of said housing;
   a panel of tempered glass spaced parallel from and on top of said receiving plate.

4. Solar heat tracking and collecting apparatus comprising
a frame;
frame rotation means engaging said frame and operable to rotate said frame in a horizontal and vertical direction;
at least one solar heat concentrator securely mounted to said frame, said concentrator including a substantially flat, rectangular, collector plate, the collector plate having a rectangular housing having a back and four sides. the housing including a fluid inlet and outlet port, and two pair of oppositely disposed, light reflective, substantially trapezoidal, planar side walls bounding the collector plate, the side walls in a converging relationship one to the other;
a solar energy sensing means disposed on said frame and operable to control said frame rotation means; and
a tri-phase solar mode sensor mounted on said frame, said mode sensor in one phase operable to enable and disable said solar energy sensing means from controlling said frame rotation means, in a second phase adapted to disable said solar sensing means and adapted to operate a timer for controlling said frame rotation means, and in a third phase operable to control said frame rotation means to reset the frame with mounted solar heat concentrator in a substantially horizontally, easterly direction.

* * * * *